Jan. 21, 1969  R. A. BAUDRY  3,423,139

THRUST BEARING PAD SUPPORT STRUCTURE

Filed May 18, 1967

WITNESSES
Theodore F. Wrobel
E. Strickland

INVENTOR
Rene A. Baudry
BY
ATTORNEY

United States Patent Office 3,423,139
Patented Jan. 21, 1969

3,423,139
THRUST BEARING PAD SUPPORT STRUCTURE
Rene A. Baudry, Paris, France, assignor to Westinghouse Electric Corporation, Pittsburgh, Pa., a corporation of Pennsylvania
Filed May 18, 1967, Ser. No. 639,426
U.S. Cl. 308—160          3 Claims
Int. Cl. F16c *17/06, 17/08, 35/00*

ABSTRACT OF THE DISCLOSURE

A thrust bearing pad arrangement comprising a relatively thick beam support means, a relatively thin pad structure having a bearing surface, and a spring plate member disposed between the support means and the pad structure. The spring plate member is separated from and supported on the beam support means by a plurality of narrow spacers or rib portions spaced apart in a radial direction and having an elongated dimension extending generally in the direction of bearing rotation. The pad structure is similarly supported on a second plurality of rib portions disposed between the spring and the side of the pad opposite the bearing surface. The second plurality of rib portions support the pad on the spring plate member at locations alternate to those of the rib portions provided on the beam support means.

Background of the invention

The present invention relates generally to thrust bearings, and particularly to a novel support structure and thrust bearing pad or shoe arrangement providing a flat bearing surface substantially free of thermal and load deflection.

An appreciable part of the available electrical energy is generated by hydroelectric units of the vertical type. The speed and size of these units is selected to obtain the most economical and efficient installation. For many years in this country the trend has been toward machines of larger rating and lower speed requiring thrust bearings of continuously increasing size and capacity.

Waterwheel generators, as other types of heavy rotating equipment, start with the large weight of the rotating parts resting on the thrust bearing. During the relatively short starting period, before an effective oil film is established, there is metal-to-metal contact between the stationary (pad) and rotating bearing (runner) surfaces. During the starting period the bearing is required to operate under adverse conditions, which necessitates the use of adequate materials, lubricants, and smooth surfaces finished to a high standard of accuracy.

After an effective oil film has been established, the bearing surfaces are no longer in contact and the bearing can operate indefinitely without appreciable wear.

The basic hydrodynamic theory of lubrication was developed many years ago. Later developments have resulted in a better understanding of the formation of the oil film and now it is possible to predetermine the performance of a thrust bearing more accurately. The determination of the oil-film thickness is based on ideal assumptions, one of which is that the thrust-bearing surfaces are plane and free of distortion. It is necessary to approach this condition in order to obtain satisfactory performance of the bearing.

On large thrust bearings, the geometry of the bearing surface is effected appreciably by distortion due to load and thermal gradients. During the starting period, such distortion may cause highly concentrated pressures which could result in localized damage to the bearing surfaces. The effect of distortion of the bearing surfaces can be aggravated by insufficient lubrication resulting from excessive aeration of the oil.

After the oil film has been established, and during normal operation, distortion of the bearing surfaces obviously must be smaller than the thickness of the oil film if metal-to-metal contact is to be avoided.

The performance of large thrust bearing pads during normal operation is vitally affected by a thermal gradient through the pad thickness which tends to cause a convex curvature of the pad surface. The thermal moment produced by the gradient must be counterbalanced by moments produced by the oil film loading and the pad support arrangement. The pad support arrangement however must be compatible with the cold condition when no thermal gradient exists. Generally a certain amount of pad convexity during normal operation and pad concavity during cold operation are accepted in the design. The difference in pad curvature between these two conditions can be reduced in several ways. One of these is the reduction of thermal moment by the reduction of pad thickness. A thinner more flexible pad must, however, be supported at more points to prevent excessive pressures on the bearing surface during operation without a complete oil film. The loading at these points must be controlled so as to control pad profile during operation.

Thus, recent large thrust bearing pads have been made more flexible with multiple supports in order to obtain good conformity with the rotating runner during starting and stopping periods. The present designs are, however, a compromise between optimum normal speed operation and starting conditions so that at normal speed there is still a relatively large thermal deflection while at start the pad is cool with the thrust load pressure and stress concentrated at the center of the pad.

Brief summary

Briefly, in accordance with the broad principles of the present invention, a thrust bearing pad is made practically free of thermal and load deflection by use of a separate support arrangement comprising a relatively thick beam structure separated from the bearing pad by a spring plate and spaced apart narrow spacers or ribs disposed between the pad and the spring plate, and between the beam and the spring plate. The narrow spacers are spaced apart in a radial direction and extend transversely of the bearing surface in the general direction of rotation. The narrow spacers on opposed sides of the spring plate are alternately spaced from each other, and may form an integral part of the pad and beam structures though the invention is not limited thereto.

Under a parabolic thrust load characteristic, the thrust pad would ordinarily become concaved or dished assuming a uniform spring constant along the length of the spring member and a rigid beam. In the invention, however, the beam is made to deflect in a convex manner by the same amount the pad deflects in a concave manner; the spring plate member deflects in the manner of the thrust pad so that the opposed deflections of the plate member and beam leave the thrust pad substantially flat.

The beam structure may be supported on a pivot means in a conventional or other manner, and is thermally isolated from the heat producing area (the bearing pad) by the spring plate member and spaced apart rib portions. The beam structure may be further cooled by circulating a cooling fluid over its top and bottom surfaces.

The spring plate member under load functions as a continuous beam, the deflection of which is determined by its thickness, the spacing of the support ribs and the load distribution across the pad. With an oil film pressure (load) of a constant shape (which is normally the case) the bearing pad will remain flat and free of thermal distortion for all loads. The spring plate member is thus able to compensate for concentrated points of loading as well as for thermal and other irregularities that may occur in the pad and its bearing surface.

From the foregoing description it can be seen that more effective cooling of the pad is made possible, and the danger of center rubbing between pad and runner at high speeds is substantially reduced. Under starting conditions the static pressure distribution is of the same shape as the oil film pressure or load and is free of concentrated loading because of the novel support structure briefly described above.

*The drawing*

The advantages and objects of the invention will be more apparent from the following detailed description taken in connection with the accompanying drawing in which.

*Description*

Figure 1:
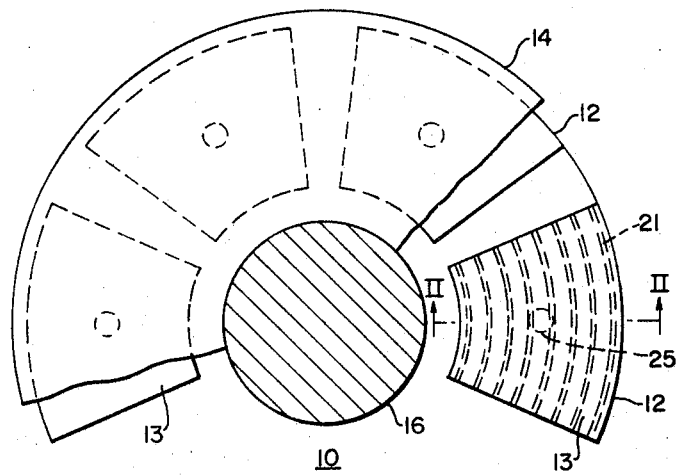
FIGURE 1 is a top partial plan view of a thrust bearing arrangement constructed in accordance with the invention.

Specifically there is shown in FIG. 1, a top partial plan view of a thrust bearing 10 comprising generally a plurality of circumferentially spaced segmental pads 12 forming non-rotating bearing surfaces 13 for cooperation with a rotating bearing surface of a thrust runner or collar 14 which may be fixed to a shaft 16. If the plan view of FIG. 1 were circumferentially completed, the runner 14 would form an annular structure about the shaft 16, and the individual pads 12 together would similarly form an annular (but interrupted) structure about the shaft. The bearing surfaces 13 of the pads may be provided by a babbitted coating shown generally exaggerated in FIG. 2 as layer 17.

Figure 2:
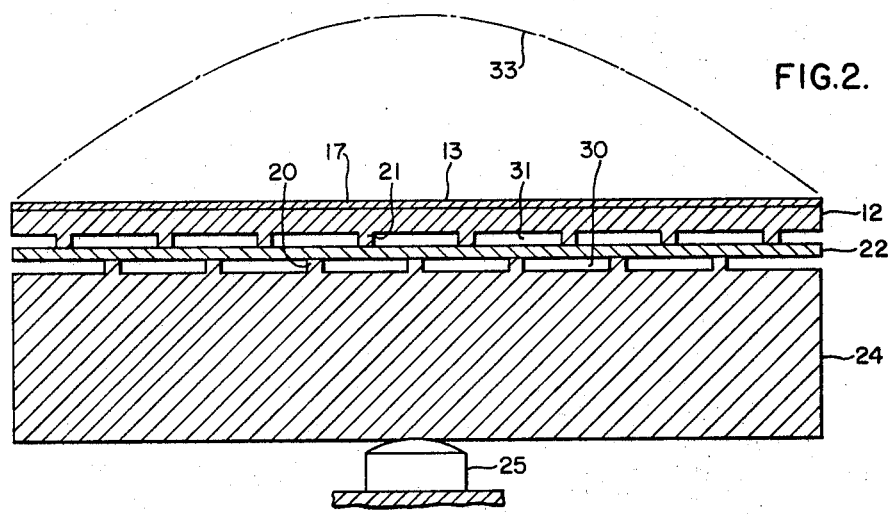
FIG. 2 is a cross-sectional view of a bearing pad taken along line II—II in FIG. 1.

As best seen in FIG. 2, the pad 12 is supported along its length by a plurality of alternately spaced apart narrow spacers or projections 20 and 21 engaging the opposite sides of a relatively thin, resilient plate member 22 disposed in a plane substantially parallel to the pad. The plate member 22 is supported on a relatively thick beam member 24 which in turn is supported on pivot means 25. The beam 24 is shown centrally pivoted in FIG. 2 only for purposes of illustration, the precise location of the pivot point depending on various operating parameters and details of bearing construction.

The resilient plate member 22 and the beam member 24 are disposed coextensively with the pad 12 having generally the same lateral dimensions as the pad.

The narrow spacers 20 and 21 preferably form an integral part of the beam 24 and pad 12, respectively, as shown in FIG. 2, since the spacers can be formed when the beam and pad surfaces are machined. The spacers 20 and 21 may, however, form an integral part of the spring plate 22, or the spacers may be made as separate components and suitably attached to the spring plate or to the beam and pad.

The alternate spacing of the narrow spacers or surface projections 20 and 21 is in a radial direction with each projection having an elongated dimension extending across the width of the thrust bearing pad in the direction of runner rotation. This is best seen by the rows of hidden (dashed) lines in FIG. 1.

The narrow spacers or projections 20 and 21 form shallow spaces 30 and 31, respectively, which separate the beam 24, the spring plate 22 and the thrust pad 12 from each other in a vertical direction, and assist in thermally isolating and cooling the members in a manner presently to be explained.

In operation, with the rotation of the thrust runner 14, a mechanical load or stress is developed along the length of each of the pads 12. The load is generally parabolic in shape, and is indicated as such in FIG. 2 by dashed line 33. Thus, the maximum load on the pad 12 is at the center thereof while the load falls towards zero as the edges of the pad are approached. With such a load configuration, the pad 12 ordinarily tends to become concave or dished with the rotation of the runner 14. The beam 24, however, is designed to deflect in a convex manner about the pivot 25 by the same amount the pad 12 has dished so that the pad and its bearing surfaces 13 remain flat.

The spring plate 22, made of a high strength resilient steel, has generally a uniform spring constant along the length of the pad so that the bending forces on the pad 12 are evenly applied through the spring plate to the beam 24. Thus, the spring plate tends to assume the shape of the pad by deflecting in a manner opposite to that of the beam. The combined effect of spring plate and beam deflection allows the pad 12 and bearing 13 to remain substantially flat under load conditions.

Figure 3:
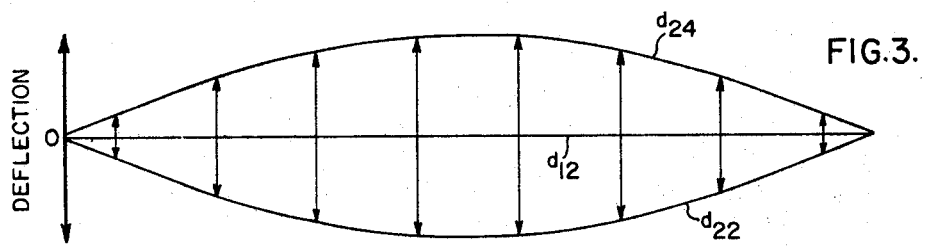
FIG. 3 is a graph showing the relative deflection of the thrust bearing pad components of FIG. 2 functioning under load conditions.

The deflection characteristics of the components under mechanical loading are graphically shown in FIG. 3 by curves $d_{12}$, $d_{22}$ and $d_{24}$ corresponding, respectively, to the pad 12, the spring plate 22 and the beam 24. As shown, curve $d_{24}$ is vertically disposed above the abscissa (curve $d_{12}$) by the same amount as curve $d_{22}$ is vertically disposed below the abscissa. The sum of the two vertically disposed curves is curve $d_{12}$, which is a straight line representative of the flatness of the pad 12.

The above analysis is for pad deflection resulting from the mechanical (thrust) load and stress exerted by the rotating thrust runner 14. The pad 12 is also subjected to thermal distortion or deflection due to the heat generated by the runner moving against the fixed pads, the bearing surfaces of pads and runner being separated only by a thin film of oil during operation of the bearing 10.

In the present disclosure, the supporting beam 24 is not substantially affected by the heat generated in the pad 12 since the beam is separated from the pad by the spring plate 22, the spacers 20, 21 and the air spaces 30, 31 provided by the spacers. The beam may further be cooled by directing a cooling fluid (for example, oil) over its exposed surfaces.

With such thermal isolation of the beam structure, the thickness of the beam may be increased without a corresponding increase in thermal distortion tendency, the thermal distortion of the components being directly related to their thickness dimensions as mentioned earlier.

Since the pads 12 are supported along their entire length, the pads may be made thinner so that they are less subject to undesirable thermal distortion. Thus, the structure of the present invention is advantageous in eliminating the problems of thermal distortion as well as those related to thrust loading.

It is easily seen that the flexural rigidity of the pads 12, the spring plates 22, the beams 24, and the spacing of the narrow spacers 20 and 21 are inter-related parameters which can be controlled to determine the curvature of the thrust pads 12. Calculations of typical spring supports and laboratory tests have demonstrated the advantages of the disclosed means as described above.

Thus, with the present invention, more effective cooling of the pads 12 can be obtained so that convex distortion thereof, due to a thermal gradient, is greatly minimized thereby substantially eliminating the danger of center rubbing of bearing surfaces 12 at high runner speeds. Under starting conditions (no oil film between pad and runner) the static pressure distribution along the pad will be of the same shape (parabolic) as the oil film pressure with rotating conditions, and free of concentrated loading.

In the usual thrust bearing application it is desirable that the spring plate 22 support the pad 12 in a radial direction in which thermal distortion is most objectional. A small curvature in the tangential or circumferential direction is generally necessary to retain the oil film so that the multi-support principle of the invention need not be applied in that direction.

While the invention has been described in connection with a preferred embodiment, it will be understood that it is not intended to be limited to the particular embodiment illustrated but is intended to cover all alternative and equivalent constructions falling within the spirit and scope of the appended claims.

What is claimed is:

1. A thrust bearing assembly for a shaft having a rotating thrust runner disposed thereon, said bearing assembly comprising;
    a plurality of segmental bearing pads having bearing surfaces for engaging the thrust runner,
    each of said pads having a support arrangement comprising a relatively thick beam support means, a spring plate member, and a plurality of radially spaced apart spacers disposed between said pad and said spring plate member, and between said spring plate member and said beam support means in planes substantially parallel to the plane of said bearing pad, and each of said spacers having an elongated dimension extending generally in the direction of shaft rotation,
    the spacers disposed between said pad and said spring plate member supporting the pad on the member at radial locations alternate to those of the spacers disposed between said spring plate member and said beam support means.

2. The assembly of claim 1 in which the pads are babbitted to provide the bearing surfaces.

3. The support arrangement of claim 1 in which the spacers form an integral part of the bearing pad and the beam support means.

References Cited
UNITED STATES PATENTS 3,018,144   1/1962   Baudry et al. _____ 308—160

MARTIN P. SCHWADRON, *Primary Examiner.*

F. SUSKO, *Assistant Examiner.*

U.S. Cl. X.R.

277—1